UNITED STATES PATENT OFFICE.

HENRY HICKS HURT, OF NEW YORK, N. Y., ASSIGNOR TO ROBESON PROCESS COMPANY, OF NEW YORK, N. Y., A CORPORATION OF NEW JERSEY.

MOLDED ARTICLE AND PROCESS OF MAKING THE SAME.

1,239,273.  Specification of Letters Patent.  Patented Sept. 4, 1917.

No Drawing.   Application filed December 5, 1916.   Serial No. 135,155.

*To all whom it may concern:*

Be it known that I, HENRY HICKS HURT, a citizen of the United States, residing at New York, in the county of New York and State of New York, have invented certain new and useful Improvements in Molded Articles and Processes of Making the Same, of which the following is a specification.

This invention relates to molded articles and processes of making the same; and it comprises as a new article of manufacture briquets, cores, and other shaped articles, road surfaces, etc., made of sand or the like bonded together with a sulfite waste liquor preparation and clay and impregnated with paraffin, wax tailings or the like; and it also comprises a method of making such articles wherein sand or the like is bonded with a waste sulfite liquor preparation, advantageously in the presence of clay, and dried and is thereafter impregnated with wax tailings, melted paraffin or the like; all as more fully hereinafter set forth and as claimed.

A bonding agent of general use for very many purposes is now commercially made from waste sulfite liquor; and occurs on the market either in the form of a thick liquid of about 30° Baumé density or as a dry material. In the sulfite process of making paper pulp, wood is heated under pressure with a solution of acid sulfite of lime, or a solution containing acid sulfites of lime and magnesia in the event that dolomitic lime is used for making the original sulfite liquor. About half the wood goes into solution and about half remains behind as paper pulp or cellulose. Little is known of the chemical constitution of the part of the wood going into solution but for the sake of a name it is often called lignone. In going into solution the lignone unites with the acid sulfite to form salts of new complex acids derived from the lignone and containing sulfur. These acids are united to the bases of the original sulfite liquor. Nothing is known definitely as to the constitution of these complex acids, but, again for convenience in nomenclature, they are called lignosulfonic acids and the salts lignosulfonates. As the sulfite liquor comes from the digester it is a thin watery liquid containing the stated bodies. It is of quite unstable character but by proper precautions, including careful neutralization and evaporation *in vacuo* (Patent 833,634) it may be concentrated to stable, thick liquids or to a dry preparation. Both are on the market. It is material of this character which I most advantageously use in the present invention although other preparations may be employed; as for instance, preparations made by evaporating the liquor in an acid condition.

As stated, little is known of the chemical nature of this material other than it contains constituents of the wood, sulfur and the bases of the original sulfite liquor. It is highly colloid in its character and is possessed of good binding properties. A large part of its use commercially is for bonding purposes and it is extensively employed for making sand cores, briquets and the like. It is also largely used in surfacing roads. The lignosulfonates are all soluble in water and articles made of sand bonded with these preparations, such as sand cores, as a rule are not resistant to moisture or steam. The same is true of briquets and bodies made of most other granular materials as for instance coal. Nevertheless the sulfite liquor preparation finds an extensive use in making sand cores and many other articles. For some reason which is not known it has been found that in making briquets and cores from sand and many other materials an addition of clay to the sulfite waste liquor gives a stronger bonding action; the bonding action being greater than the sum of the bonding action of the sulfite liquor alone, and that of the clay alone (see Patent 1,069,031). The clay also adds to the water resistant qualities of the bonded article. Why these actions should take place is not known since there is no obvious chemical reason for the same. This fact however contributes materially in making the sulfite liquor preparations useful in bonding or surfacing roads; an application in which they now find a large use (see Patent 1,069,029).

I have found that in making briquets and cores with sand bonded by clay and waste sulfite liquor preparations that I can obtain a great increase in strength for some reason by impregnating the article after its manufacture and drying with wax tailings or other form of paraffin. Wax tailings are the crude material from which paraffin is commercially made. In distilling petroleum, after the lighter fractions are distilled over it is the custom to push the distillation with the aid of steam. The last distillate going over before the residue in the still is converted into coke is what is known as wax tailings. In and of themselves paraffin and wax tailings have no substantial binding action for the present purposes; nor do they give shaped articles of any degree of strength. They have a waterproofing action of course but no strengthening action ordinarily. But I have found that for some reason there is a great increment of strength in treating these molded articles made as described with paraffin or wax tailings. The same principle may be applied in surfacing roads of sand or the like. In such event, I preliminarily impregnate the surface of the road with a sulfite waste liquor preparation, which may be either the described commercial 30° Baumé concentrate rediluted to a convenient strength or may be a commercial dried preparation dissolved in water. After a period of time to allow the road to dry somewhat it is next impregnated with hot wax tailings, or with wax tailings diluted down with a lighter oil. The liquid sulfite preparation may be mixed with more or less clay prior to application to the road. Very frequently however there is enough clay, even in a sand road, to make a special admixture of clay with the sulfite liquor unnecessary.

In one specific instance in making cores under the present invention, certain cores were made with commercial 30° Baumé sulfite liquor, clay and sand, clay and sand being used in the ratio of 15:85 and the sulfite liquor in the proportion of one part by volume of the commercial 30° Baumé liquor to 25 parts by volume of the sand clay mixture. These cores on drying gave a tensile strength of about 230 pounds per inch. After manufacture and thorough drying the cores were dipped in melted paraffin and, strangely enough, the tensile strength was found to increase about 40 per cent., the cores now showing a strength of 322 pounds. Similar results were obtained with the use of wax tailings in lieu of paraffin. The dipped articles were of course thoroughly waterproof, the wax having a waterproofing function in addition to its function as a co-binder with the sulfite liquor.

I find that the preparation of the core or briquet and drying should be preliminary to the use of the wax or wax tailings to obtain the results here noted. When the wax or wax tailings is emulsified with the sulfite liquor the result is not so good.

While I have described this invention more particularly in its use for bonding sand cores and the like it is of course not restricted thereto but may be applied to cores and bricks made of other granular material, such as pyrites fines, coal and the like; and to making roads and a wide variety of other purposes.

While I have described this invention more particularly as applying to the production of molded articles wherein the bonding agent contains both a waste sulfite liquor preparation and clay, I find that waste sulfite liquor alone may be used for bonding and the dried article afterward impregnated with or dipped into a melted paraffin or wax tailings with an increase in the strength of the articles as compared with the same article not so dipped or impregnated and this strength it retains because of the waterproofing action of the wax. Various other admixtures with the sulfite liquor other than clay may of course be used.

The wax tailings may of course be more or less admixed with other oily materials for various purposes. I find the wax tailings however sufficient for most purposes, though for special applications I may incorporate linseed oil, petroleum oil, etc.

What I claim is:

1. An article composed of granular material bonded and united by a bonding agent comprising clay and a waste sulfite liquor preparation, said article being impregnated with a waxy material.

2. An article composed of granular material bonded and united by a bonding agent comprising a waste sulfite liquor preparation, said article being impregnated with a waxy material.

3. An article composed of granular material bonded and united by a bonding agent comprising clay and a waste sulfite liquor preparation, said article being impregnated with wax tailings.

4. An article composed of granular material bonded and united by a bonding agent comprising a waste sulfite liquor preparation, said article being impregnated with wax tailings.

5. The process of making bonded articles which comprises bonding granular material with a bonding agent comprising clay and waste sulfite liquor, drying and impregnating with a waxy material.

6. The process of making bonded articles which comprises bonding granular material with a bonding agent comprising clay and waste sulfite liquor, drying and impregnating with wax tailings.

7. The process of making bonded articles which comprises bonding granular material with a bonding agent comprising waste sulfite liquor, drying and impregnating with a waxy material.

In testimony whereof, I affix my signature.

HENRY HICKS HURT.

Witnesses:
B. W. BULLEN,
JAS. A. SHIRRAS.